(12) United States Patent
Ranasinghe

(10) Patent No.: US 6,499,302 B1
(45) Date of Patent: Dec. 31, 2002

(54) METHOD AND APPARATUS FOR FUEL GAS HEATING IN COMBINED CYCLE POWER PLANTS

(75) Inventor: Jatila Ranasinghe, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/893,606

(22) Filed: Jun. 29, 2001

(51) Int. Cl.[7] ............................. F02C 6/18; F02C 7/224
(52) U.S. Cl. .................. 60/772; 60/39.182; 60/736
(58) Field of Search ......................... 60/772, 39.182, 60/736

(56) References Cited

U.S. PATENT DOCUMENTS

| | | | | |
|---|---|---|---|---|
| 4,099,374 A | * | 7/1978 | Foster-Pegg | 60/39.182 |
| 5,251,432 A | * | 10/1993 | Bruckner et al. | 60/39.182 |
| 5,649,416 A | | 7/1997 | Moore | |
| 5,660,799 A | * | 8/1997 | Motai et al. | 60/39.182 |
| 6,145,295 A | * | 11/2000 | Donovan et al. | 60/39.182 |
| 6,173,563 B1 | * | 1/2001 | Vakil et al. | 60/39.182 |
| 6,178,734 B1 | * | 1/2001 | Shibuya et al. | 60/39.182 |
| 6,263,662 B1 | * | 7/2001 | Nagashima | 60/39.182 |
| 6,269,626 B1 | * | 8/2001 | Kim | 60/39.182 |
| 6,389,794 B2 | * | 5/2002 | Ranasinghe et al. | 60/39.182 |

* cited by examiner

Primary Examiner—Ted Kim
(74) Attorney, Agent, or Firm—Nixon & Vanderhye P.C.

(57) ABSTRACT

A combined cycle power plant system, comprising a compressor; a combustor receiving air provided by the compressor; a gas turbine for expanding gas provided by the compressor; a heat recovery steam generator (HRSG) for receiving exhaust gases from the gas turbine. The heat recovery steam generator (HRSG) receives exhaust gases from the gas turbine. The HRSG includes a low pressure (LP) section; a high pressure (HP) section for receiving exhaust gases from the gas turbine and located upstream of the LP section, each of the LP and HP sections include an evaporator section. An intermediate pressure (IP) section is located between the HP and the LP sections, the IP section includes an economizer, first and second evaporators, and a water heater (34) disposed between the first and second evaporators. A fuel gas heater is provided for receiving heated water from the water heater.

18 Claims, 2 Drawing Sheets

METHOD AND APPARATUS FOR FUEL GAS HEATING IN COMBINED CYCLE POWER PLANTS

FIELD OF THE INVENTION

This invention relates to combined cycle power plants, and more particularly, it relates to a method for fuel gas heating to improve thermal efficiency of combined cycle power plants.

BACKGROUND OF THE INVENTION

Combined cycle power plants and cogeneration facilities utilize gas turbines (GT(s)) as prime movers to generate power. These GT engines operate on the Brayton Cycle thermodynamic principle and typically have high exhaust flows and relatively high exhaust temperatures. These exhaust gases, when directed into a heat recovery boiler (typically referred to as a heat recovery steam generator (HRSG)), produce steam that can be used to generate more power. The produced steam can be directed to a steam turbine (ST) to produce additional power. In this manner, a GT produces work via the Brayton Cycle, and a ST produces power via the Rankine Cycle. Thus, the name "combined cycle" is derived. In this arrangement, the GT Brayton Cycle is also referred to as the "topping cycle" and the ST Rankine Cycle is referred to as the "bottoming cycle," as the topping cycle produces the energy needed for the bottoming cycle to operate.

As technology progressed, the trend for the use of steam engines diminished and the use of steam turbines increased. One advantage of the steam turbine is its overall cycle efficiency when used in conjunction with a condenser. This approach allows the steam to expand significantly beyond normal atmospheric pressure and down to pressures that were only slightly above an absolute vacuum (0.5 to 2 pounds per square inch absolute (psia)). This allows the steam to expand further than in an atmospheric exhaust configuration, extracting more energy from a given mass of steam, thus producing more power and increasing overall steam cycle efficiency. This overall steam cycle, from a thermodynamic perspective, is referred to as the Rankine Cycle.

In many cogeneration and combination GT/ST power plants built today, combined cycle plants have come to mean power plants that utilize a Brayton Cycle as the topping cycle and a Rankine Cycle as the bottoming cycle. These plants utilize a gas turbine (GT) as the prime mover (Brayton Cycle machine), with a HRSG at the exhaust of the gas turbine to recover waste heat. The HRSG produces steam that is then supplied to a (ST) to produce more power. Due to the high temperatures of the working fluid in the GT and recovery of waste heat, the combined cycle plants are much more fuel efficient than the conventional steam plants.

Fuel gas heating in combined cycle power plants is typically performed to increase the thermal efficiency of the power plants. In one approach, hot water extracted from the exit of an IP economizer (i.e., the water entering an IP evaporator) of a heat recovery steam generator (HRSG) is used for fuel gas heating. In this approach, the maximum fuel gas heating temperature is limited by the temperature of the extracted water, which is typically lower than the saturation temperature of the IP evaporator. This approach limits fuel gas heating, thus limiting the efficiency of combined cycle power plants using IP water. Although higher fuel gas heating temperature improves the thermal efficiency of a power plant, a higher operating pressure of the IP evaporator has a detrimental effect on the steam cycle power output and the thermal efficiency of the power plant. Therefore, IP evaporator is typically operated at an optimum pressure in a combined cycle power plant, thus limiting the fuel gas heating temperature and the efficiency of the power plant.

In order to increase the temperature of the water available for fuel gas heating, water from high pressure economizers upstream of IP evaporator may be used. However, using high pressure water considerably increases the cost of fuel gas heating while presenting a reliability concern in the event of a failure. In one design, the available IP water temperature has limited fuel gas heating to 365° F., in GE (F) class gas turbine combined cycle power plants. Thus, there is a need to improve the thermal cycle efficiency of combined cycle power plants overcoming the problems faced by prior systems.

SUMMARY OF THE INVENTION

Accordingly, the present invention provides a system and a method for recovering exhaust heat to further heat IP water for fuel gas heating to improve the thermal cycle efficiency of combined cycle power plants.

The system and method of the present invention increase the fuel gas heating temperature of combined cycle power plants, with IP water as the fuel gas heating medium, while maintaining the IP drum pressure at the steam cycle optimum. A fuel water heating section is provided in the HRSG at a location upstream of the intermediate pressure economizer (IP-EC) section of the HRSG and further between intermediate pressure evaporator tubes. A high pressure (HP) section and a low pressure (LP) section of the HRSG may also include one or more economizers arranged in various configurations. Also, each of the HP, IP, and LP sections may include superheaters. Fuel heating water is extracted from the IP-EC discharge and delivered to the fuel water heater section for further increasing the temperature of the fuel heating water prior to its delivery to the fuel gas heater. The higher fuel heating water thus allows the fuel to be heated to a higher temperature, thereby increasing the efficiency of the combined cycle power plant. The present invention overcomes the maximum heating temperature limits typically imposed by the IP drum operating pressure in the prior fuel gas heating methods.

In one aspect, a combined cycle power plant system, comprising a compressor; a combustor receiving air provided by the compressor; a gas turbine for expanding gas provided by the compressor; a heat recovery steam generator (HRSG) for receiving exhaust gases from the gas turbine, the HRSG having a low pressure (LP) section; a high pressure (HP) section, the HP section receiving exhaust gases from the gas turbine and located upstream of the LP section, each LP and HP sections having an evaporator; an intermediate pressure (IP) section located between the HP and the LP sections, the IP section comprising an economizer, first and second evaporators, and a water heater disposed between the first and second evaporators; and a fuel gas heater for receiving heated water from the water heater. The water heater may be located upstream of the economizer. The fuel-heating water extracted from the economizer is heated to a higher temperature in the water heater prior to delivery to the fuel gas heater. The water pressure in both the economizer and the water heater is maintained to prevent steaming of the fuel-heating water. The first evaporator is preferably located between the HP evaporator section and the water heater. The first evaporator may protect the fuel-heating water from steaming. The fuel-heating water is preferably heated to a temperature that is higher than the saturation temperature of the first and second evaporators.

In another aspect, the present invention describes a method of increasing the temperature of fuel-heating water in a combined cycle power plant, comprising flowing exhaust gas stream from a gas turbine through a heat recovery steam generator (HRSG), the HRSG having plural sections including an intermediate pressure (IP) section, a high pressure(HP) section, and a low pressure (LP) section; providing a water heater between first and second evaporators of the IP section, the second evaporator being located downstream of the first evaporator relative to the flow of the gas stream through the HRSG; flowing fuel-heating water from an economizer to the water heater, the economizer located downstream of the water heater; heating the fuel-heating water in the water heater; and delivering the heated water to a fuel gas heater.

In yet another aspect, a combined cycle power plant system, comprising: a gas turbine; a fuel gas heater; a heat recovery steam generator (HRSG) having plural sections including an intermediate pressure (IP) section with an evaporator having first and second evaporator sections, the HRSG in heat exchange relation with exhaust gases from the gas turbine; and a fuel-water heater disposed between the first and second evaporator sections for heating the fuel-heating water to a temperature higher than a saturation temperature of the evaporator.

In a further aspect, a method of heating fuel gas in combined cycle power plants, comprising: providing a heat recovery steam generator (HRSG) for receiving exhaust gases from a gas turbine; receiving water in the HRSG; providing first and second evaporators in an intermediate pressure section of a heat recovery steam generator; locating a water heater between the first and second evaporators for heating water; and delivering heated water from the water heater to a fuel gas heater.

In another aspect, a combined cycle power plant apparatus, comprising: a heat recovery system having a plurality of sections for receiving and recovering heat from a gas turbine exhaust; the heat recovery system comprising a water heater located in at least one section of the heat recovery system, the water heater capable of further heating fuel-heating water received from the one section of the heat recovery system; and a fuel gas heater receiving fuel-heating water further heated by the water heater.

The benefits of the present invention will become apparent to those skilled in the art from the following detailed description, wherein a preferred embodiment of the invention is shown and described, simply by way of illustration of the best mode contemplated of carrying out the invention.

DETAILED DESCRIPTION OF THE INVENTION

Figure 1:
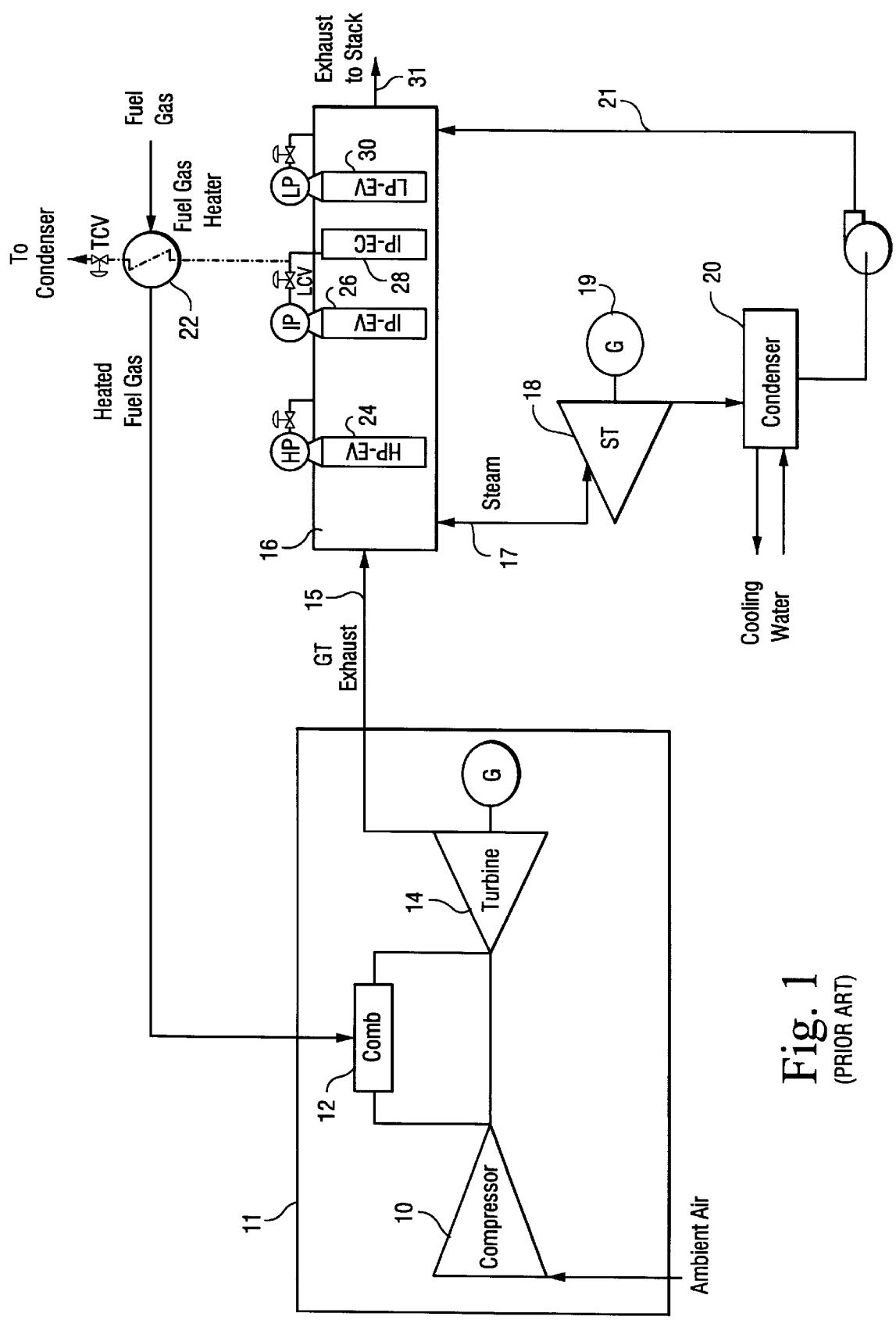
FIG. 1 illustrates a conventional method to use hot water extracted from the exit of the IP economizer for fuel gas heating.

FIG. 1 illustrates a schematic flow diagram of a typical three-pressure combined cycle power plant. The power plant includes a compressor 10, a combustor 12, and a turbine 14 powered by expanding hot gases produced in the combustor 12 for driving an electrical generator G. Exhaust gases from the gas turbine 14 are supplied through conduit 15 to a heat recovery steam generator (HRSG) 16 for recovering waste heat from the exhaust gases. The HRSG includes high pressure (HP), intermediate pressure (IP), and low pressure (LP) sections. Each of the HP, IP, and LP sections include an evaporator section 24, 26, 30, respectively. The IP section further includes an economizer section 28 for pre-heating water before it is converted to steam in the evaporator section 26. Water from the economizer 28 is used to heat up the fuel gas in a fuel gas heater 22. The HP and LP sections may also include economizers. Water is fed to the HRSG 16 through line 21 in order to generate steam. Heat recovered from the exhaust gases supplied to HRSG is transferred to water/steam in the HRSG 16 for producing steam which is supplied through line 17 to a steam turbine 18 for driving a generator 19. Line 17 represents multiple steam lines between the HRSG 16 and ST 18 for the steam produced at different pressure levels. Cooled gases from the HRSG 16 are discharged into atmosphere via exit duct 31.

Figure 2:
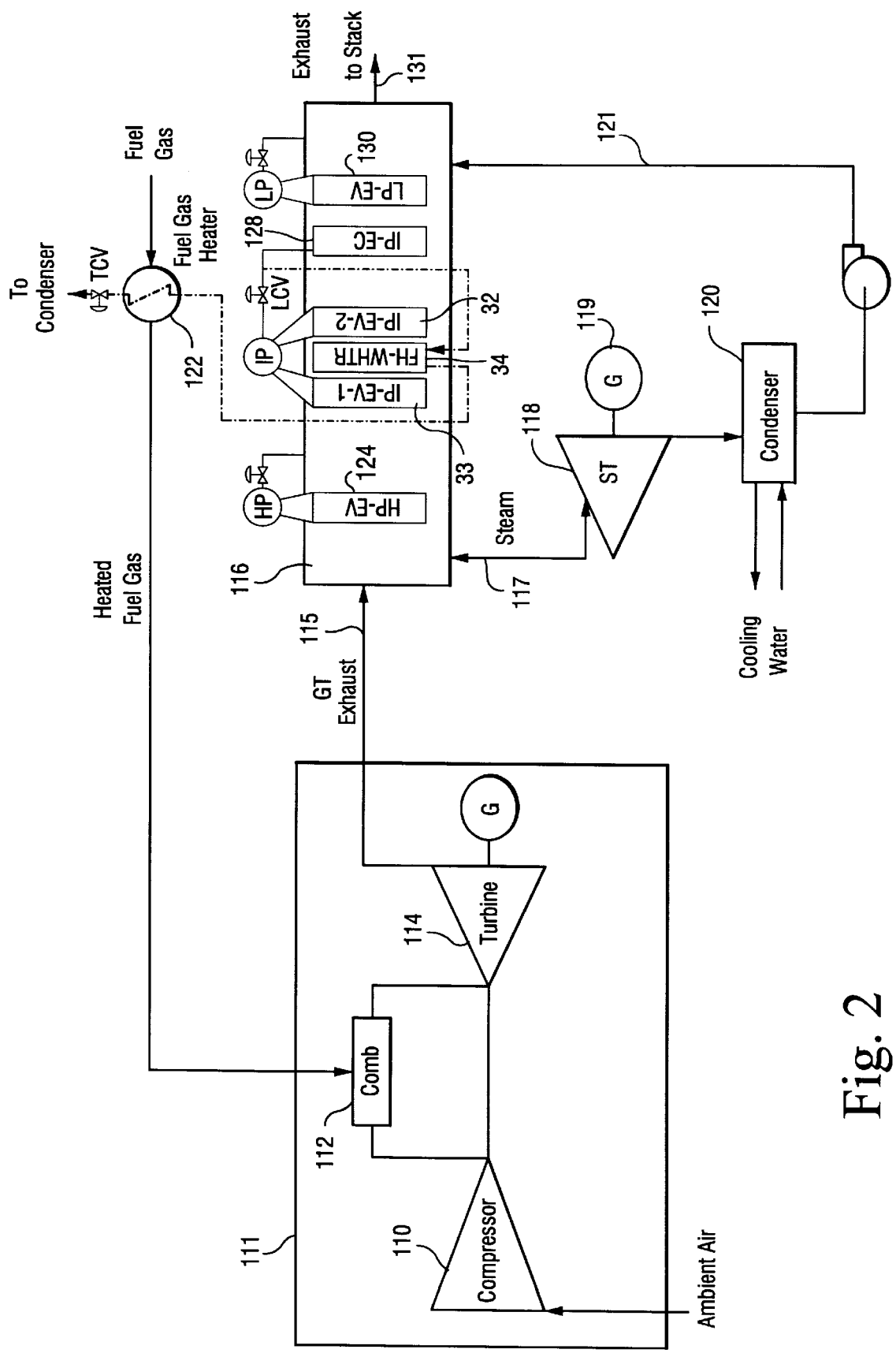
FIG. 2 illustrates a method of using hot water extracted from the exit of the IP economizer for fuel gas heating in accordance with a preferred embodiment of the present invention.

FIG. 2 shows a combined-cycle power plant in accordance with the present invention. Here, elements that are in common with FIG. 1 are identified with similar reference numerals, but with a prefix "1" added. The combined-cycle power plant includes a fuel-water heating section (water heater) 34 in the HRSG 116. Water heater 34 is located between IP evaporator sections 32 and 33, while evaporator sections 32, 33 are located upstream of the economizer 128. Fuel heating water is extracted from the economizer 128 discharge for further heating in the water heater 34 prior to its delivery to the fuel gas heater 122. Water heater 34 is located downstream of IP evaporator 33 in order to protect fuel heating water in water heater 34 from steaming during a transient operation. The evaporator section 33 located upstream of the water heater 34 may act as screen tubes in the event of high exhaust gas temperatures during transient cycle operation. The water heater 34 allows the fuel heating IP water to be further heated to a temperature that is higher than the saturation temperature of the IP evaporator sections 32 and 33 prior to entering the fuel gas heater 122. The water pressure in the IP economizer 128 and the water heater 34 are preferably maintained at a level to prevent steaming of the fuel-heating water, with upstream evaporator 33 providing additional protection from steaming. The higher fuel-heating water temperature thus allows the fuel-heating water to be heated to a higher temperature, for example, to about 440° F. The increased temperature of the fuel-heating water increases the combined cycle efficiency of a power plant. For example, the present invention increased the combined cycle efficiency of GE(F) class 3-pressure system by 0.08% points.

While the invention has been described in connection with what is presently considered to be the most practical and preferred embodiment, it will be understood that the invention is not to be limited to the disclosed embodiment, but on the contrary, is intended to cover various modifications and equivalent arrangements included within the spirit and scope of the appended claims.

What is claimed is:

1. A combined cycle power plant system, comprising:

a compressor;

a combustor receiving air provided by the compressor;

a gas turbine for expanding gas provided by the compressor;

a heat recovery steam generator for receiving exhaust gases from the gas turbine, said heat recovery steam generator comprising a low pressure section;

a high pressure section for receiving exhaust gases from the gas turbine and located upstream of said low pressure section, each said low pressure section and high pressure section having an evaporator section;

an intermediate pressure section located between said high pressure and said low pressure sections, said intermediate pressure section comprising an economizer, first and second evaporators, and a water heater disposed between said first and second evaporators; and a fuel gas heater for receiving heated water from said water heater.

2. The system of claim 1 wherein said water heater is located upstream of the economizer of said intermediate pressure section.

3. The system of claim 2, wherein fuel-heating water extracted from said economizer is heated to a higher temperature in said water heater prior to delivery to said fuel gas heater.

4. The system of claim 3, wherein the fuel-heating water is heated to a temperature that is higher than the saturation temperature of said first and second evaporators.

5. The system of claim 1, wherein said first evaporator in said heat recovery steam generator is located between said high pressure evaporator section and said water heater.

6. A method of increasing the temperature of fuel-heating water in a combined cycle power plant, comprising:

flowing an exhaust gas stream from a gas turbine through a heat recovery steam generator, said heat recovery steam generator comprising plural sections including an intermediate pressure section, a high pressure section, and a low pressure section;

providing a water heater between first and second evaporators of said intermediate pressure section, said second evaporator being located downstream of said first evaporator relative to the flow of the gas stream through the heat recovery steam generator;

flowing fuel-heating water from an economizer located in the intermediate pressure section to said water heater, said economizer located downstream of said water heater;

heating the fuel-heating water in said water heater; and delivering the heated water to a fuel gas heater.

7. The method of claim 6, further comprising:

maintaining water pressure in both the economizer and the water heater to prevent steaming of said fuel-heating water.

8. The method of claim 7, including heating the fuel-heating water to a temperature higher than the saturation temperature of the first and second evaporators.

9. The method of claim 6, further comprising:

locating the first evaporator upstream of the water heater to prevent steaming of the fuel-heating water.

10. A combined cycle power plant system, comprising:

a gas turbine;

a fuel gas heater;

a heat recovery steam generator having plural sections including an intermediate pressure section with an evaporator having first and second evaporator sections, said heat recovery steam generator in heat exchange relation with exhaust gases from said gas turbine; and a fuel-water heater disposed between said first and second evaporator sections for heating the fuel-heating water to a temperature higher than a saturation temperature of the evaporator.

11. The system of claim 10, wherein said water heater is located upstream of an economizer of the intermediate pressure section.

12. The system of claim 11, wherein fuel-heating water extracted from said economizer is heated to a higher temperature in said water heater prior to delivery to said fuel gas heater.

13. A method of heating fuel gas in combined cycle power plants, comprising:

providing a heat recovery steam generator for receiving exhaust gases from a gas turbine;

receiving water in said heat recovery steam generator;

providing first and second evaporators in an intermediate pressure section of a heat recovery steam generator;

locating a water heater between said first and second evaporators for heating water; and delivering heated water from said water heater to a fuel gas heater.

14. The method of claim 13, further comprising:

maintaining water pressure in an economizer of said intermediate pressure section, and the water heater, respectively to prevent steaming of the fuel-heating water.

15. The method of claim 14, further comprising:

heating fuel-heating water to a temperature higher than the saturation temperature of the first and second evaporators.

16. A combined cycle power plant apparatus comprising:

a heat recovery steam generator having a high pressure section, an intermediate pressure section and a low pressure section for receiving and recovering heat from a gas turbine exhaust;

said heat recovery steam generator including a water heater located upstream of an economizer in the intermediate pressure section relative to a direction of flow of the gas turbine exhaust, said water heater adapted to heat water received from said one of said plurality of sections of said heat recovery steam generator;

and a fuel gas heater arranged to receive said water from said water heater.

17. The combined cycle power plant apparatus as in claim 16 wherein said water heater is located between a pair of evaporators in said intermediate pressure section.

18. The combined cycle power plant of claim 17 wherein said water heater is located between a pair of evaporators in said intermediate pressure section, and wherein the fuel heating water is received from an economizer in said intermediate pressure section.

* * * * *